A. TAYLOR.
CULTIVATOR.
APPLICATION FILED DEC. 11, 1909.
997,426.
Patented July 11, 1911.
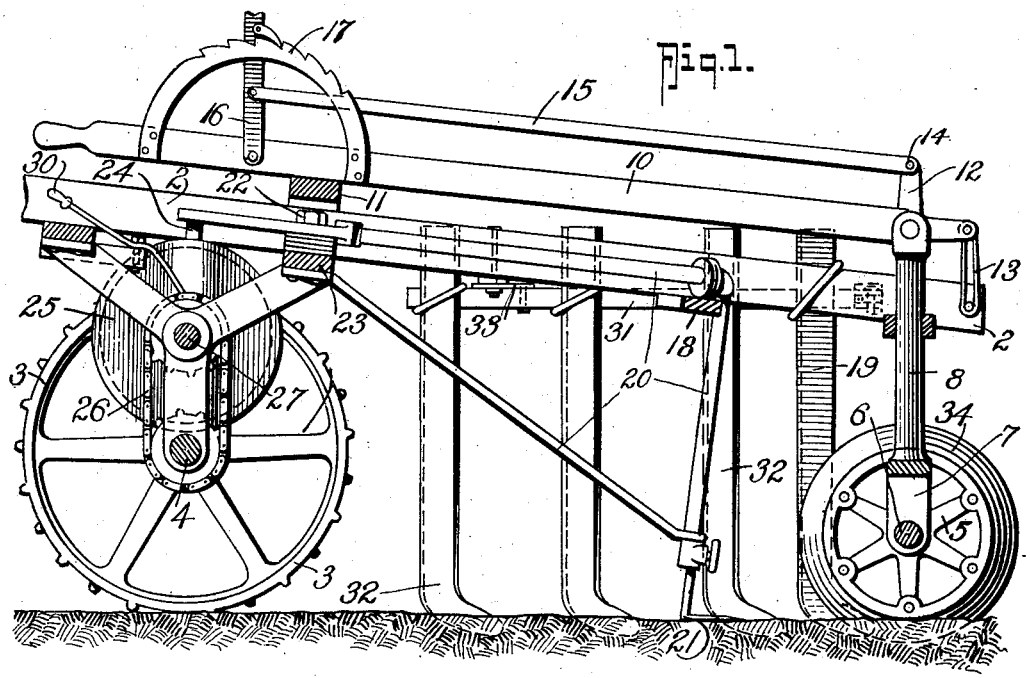
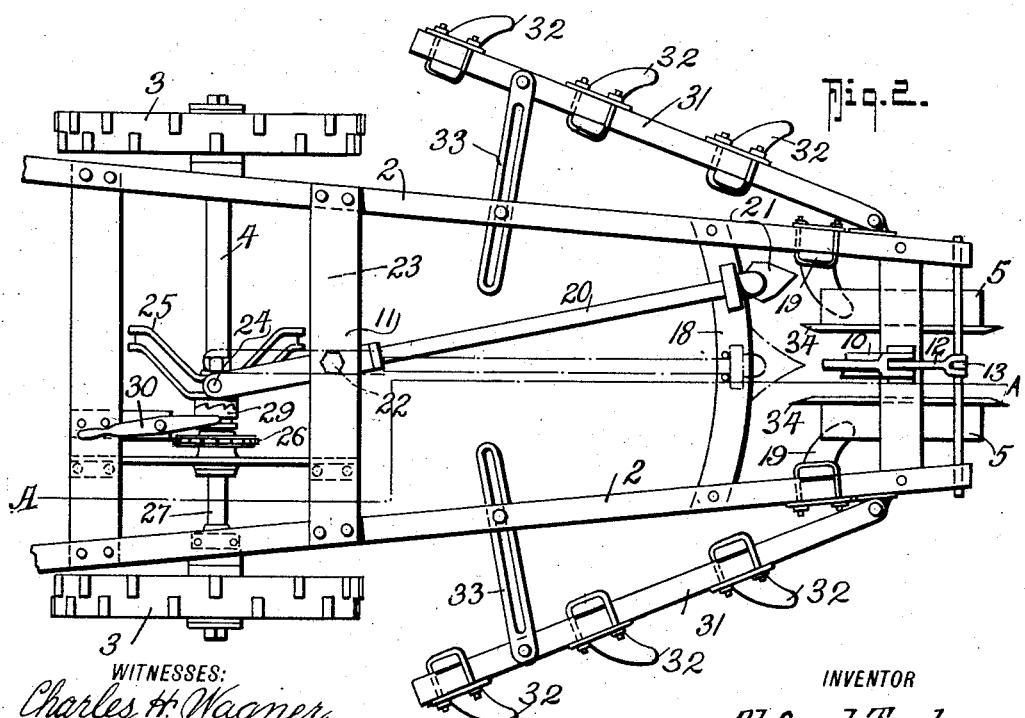
WITNESSES:
Charles H. Wagner
John T. Schrott
INVENTOR
Alfred Taylor
BY
Fred J. Dieterich
ATTORNEY.
COLUMBIA PLANOGRAPH CO., WASHINGTON, D. C.

UNITED STATES PATENT OFFICE.

ALFRED TAYLOR, OF COLWOOD, BRITISH COLUMBIA, CANADA.

CULTIVATOR.

997,426.  Specification of Letters Patent.  Patented July 11, 1911.

Application filed December 11, 1909. Serial No. 532,666.

*To all whom it may concern:*

Be it known that I, ALFRED TAYLOR, citizen of the Dominion of Canada, residing at Colwood, in the Province of British Columbia, Canada, have invented a new and useful Cultivator, of which the following is a specification.

This invention relates to a cultivator designed to stir the soil by undercutting the surface on each side of a seed drill or plant row and that will at the same time thin out when required the seedlings in the drill to the required distance apart for culture.

The invention is particularly described in the following specification, reference being made to the drawings by which it is accompanied, in which:

Figure 1 is a longitudinal sectional elevation on the line A A in Fig. 2, and Fig. 2, is a plan with the top levers removed.

The carriage of the machine consists of a light frame 2 supported on two pairs of wheels 3 and 5. The wheels 3 toward the after end are secured on a driving axle 4 by which the reciprocating mechanism of the spacing blade is operated, and the leading pair of wheels 5 are mounted on the axle 6 of a forked frame 7 the vertical spindle 8 of which is vertically as well as pivotally movable in the forward end of the frame. The movement of the leading pair of wheels to direct the course of the machine, is effected by a steering lever 10 mounted in the head of the stem 8 and at the after end of the machine traveling across a guide 11 extending between the side frames at the necessary height for convenient reach.

The frame is supported and adjusted vertically on the stem 8 by a bell-crank lever 12 the horizontal arm of which is anchored by links 13 to an extension from the frame of the machine and the vertical arm connected at 14 by a rod 15 to a handle lever 16 pivotally mounted in the steering lever 10 so as to be laterally movable with it. This handle lever 16 travels over an arc 17 to which it may be secured in any desired position of adjustment by any approved means. Thus by moving the lever forward the frame of the machine is lowered on the stem 8 and by pulling the lever back it is raised thereon, thus raising or lowering the weeding blades in relation to the surface of the ground.

Secured to and downwardly projecting from the side frames 2 of the machine toward the forward end are weed cutting blades 19 which are adjustable in their attachment to the frame and are designed to cut the weeds just below the surface of the soil on each side of the seed drill.

Pivotally mounted at 22 on a cross rail 23 of the machine frame is a triangular tubular frame the weight of the forward end of which is supported by means of a roller on a supporting segment 18 so that the frame is susceptible of being moved from side to side of the machine. This movement is effected by means of a roller 24 on the rearwardly projecting end of the frame 20 which roller runs in a groove in a cam 25 removably secured on a short shaft 27 rotatably mounted in bearings on the frame and driven from the axle 4 of the machine by a chain gear 26. The cam 25 itself runs loose on its shaft 27 but may be secured to rotate with the shaft by a clutch 29 thrown in or out of action by a handle lever 30 pivotally mounted on the frame adjacent.

Telescopically socketed in the vertical member of the triangular frame 20 is a weed cutting blade 21 the form of which may be varied to suit the requirements of the work.

Hinged on each side of the frame 2 toward the forward end are winged frames 31 which are adjustable in their distance from the machine by stay links 33 and from these winged frames downwardly project weed cutting blades 32 which are adjustable in their attachment.

When used simply as a weeder and cultivator the cam 25 is unclutched and the frame 20 may be secured in the center or elsewhere as desired but when used to thin out a seed drill the cam 25 is clutched to turn with the shaft 27 and the blade 21 is traversed back and forth across the seed drill and will thin out the seedlings to the required distance apart.

When the cultivator is to be used for weeding strawberry plants circular cutting knives 34 are secured to the inner edges of the leading wheels and are designed to cut the runners of the plants while the other blades will stir the ground and cut the weeds.

The cam 25 is removably mounted on an overhung end of the shaft on which it rotates so that the cam may be changed to suit the various plants which the machine may be required to cultivate or weed.

From the after end of the machine the side frames may be prolonged to form handles as in a plow by which the machine may be pushed or by which it may be guided if horse traction is used.

Having now particularly described my invention and the manner of its use, I hereby declare that what I claim as new and desire to be protected in by Letters Patent, is:

1. In an apparatus of the class described, a wheeled frame including a driving shaft, a cutter carrying frame pivoted to said wheeled frame on a substantially vertical axis, power transmitting and translating devices connecting said driving shaft with said cutter carrying frame in virtue of which the movement of said driving shaft will be transmitted and translated to said cutter carrying frame to move the same on its pivot and thereby move the cutter laterally in a substantially horizontal plane, means for adjusting the plane of said wheeled frame to raise or lower the same, and means for adjustably connecting the cutter to said cutter carrying frame whereby the adjustment of said wheeled frame may be compensated for by adjusting said cutter in said cutter carrying frame, an arc bar secured to said wheeled frame, said cutter carrying frame including a portion held in a plane parallel to the plane of said wheeled frame and passing over said bar, and a roller on said cutter carrying frame to ride on said bar.

2. In a machine of the character described a main frame, a pair of Y-members secured beneath said frame, a shaft mounted in bearings in the lower end of said Y-members, traction wheels mounted on said shaft, a counter shaft mounted in bearings in said Y-members to lie above said wheeled shaft, power transmission connections between said shafts that include a clutch, a cam mounted on said counter shaft, means for shifting said clutch in and out of engagement with said cam, a cross bar on said main frame, a cutter carrying frame including a portion projecting parallel to said main frame and pivoted to said cross bar, a connection between said cutter carrying frame and said cam to cause said cam to reciprocate said cutter carrying frame, said cutter carrying frame including a portion projecting downwardly from said first mentioned portion and terminating in a socket, a cutter held in said socket, said cutter carrying frame including a brace secured adjacent to said socket and pivoted beneath said cross bar.

3. In a machine of the character described a main frame, a pair of Y-members secured beneath said frame, a shaft mounted in bearings in the lower end of said Y-members, traction wheels mounted on said shaft, a counter shaft mounted in bearings in said Y-members to lie above said wheeled shaft, power transmission connections between said shafts that include a clutch, a cam mounted on said counter shaft, means for shifting said clutch in and out of engagement with said cam, a cross bar on said main frame, a cutter carrying frame including a portion projecting parallel to said main frame and pivoted to said cross bar, a connection between said cutter carrying frame and said cam to cause said cam to reciprocate said cutter carrying frame, said cutter carrying frame including a portion projecting downwardly from said first mentioned portion and terminating in a socket, a cutter held in said socket, said cutter carrying frame including a brace secured adjacent to said socket and pivoted beneath said cross bar, an arc bar carried by said main frame and passing under that portion of said cutter carrying frame which is parallel to said main frame, adjacent to the downwardly projecting portion of said cutter carrying frame to support the same.

In testimony whereof I have signed my name to this specification in the presence of two subscribing witnesses.

ALFRED TAYLOR.

Witnesses:
 IRA JOHN JUDD FISHER,
 WALTER POOL.

---

Copies of this patent may be obtained for five cents each, by addressing the "Commissioner of Patents, Washington, D. C."